United States Patent
Ries et al.

(10) Patent No.: US 9,096,230 B2
(45) Date of Patent: Aug. 4, 2015

(54) HYSTAT DRIVE SYSTEM HAVING COASTING FUNCTIONALITY

(75) Inventors: Michael W. Ries, Coon Rapids, MN (US); Paul A. Dvorak, Sanford, NC (US); Mark L. Norton, Eden Prairie, MN (US); Jon M. Scharf, Maple Grove, MN (US); Christopher J. Demick, Fuquay-Varina, NC (US); Christopher M. Elliott, Apex, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 258 days.

(21) Appl. No.: 13/470,968

(22) Filed: May 14, 2012

(65) Prior Publication Data

US 2013/0104532 A1 May 2, 2013

Related U.S. Application Data

(60) Provisional application No. 61/554,124, filed on Nov. 1, 2011.

(51) Int. Cl.
*B60W 30/00* (2006.01)
*B60W 30/18* (2012.01)
(Continued)

(52) U.S. Cl.
CPC ....... *B60W 30/18045* (2013.01); *F16H 61/421* (2013.01); *F16H 61/431* (2013.01); *F16H 61/438* (2013.01); *F16H 61/47* (2013.01); *B60K 2026/029* (2013.01); *B60W 2030/1809* (2013.01); *B60Y 2200/413* (2013.01)

(58) Field of Classification Search
CPC ............. B60W 30/18072; B60W 2030/1809; F16H 61/40; F16H 61/42–61/478; B60K 2026/029; B60Y 2200/413

USPC .............. 180/305, 306, 307, 308; 701/50
See application file for complete search history.

(56) References Cited

U.S. PATENT DOCUMENTS

| | | | |
|---|---|---|---|
| 3,579,988 A | 5/1971 | Firth et al. | |
| 3,739,578 A | 6/1973 | Roeske | |

(Continued)

FOREIGN PATENT DOCUMENTS

| | | |
|---|---|---|
| JP | 2011052792 | 3/2011 |
| KR | 10611714 | 8/2006 |

OTHER PUBLICATIONS

U.S. Patent Application of Michael W. Ries et al. entitled "Hystat Drive System Having Engine Speed Control" filed on May 14, 2012.

*Primary Examiner* — J. Allen Shriver, II
*Assistant Examiner* — Emma K Frick
(74) *Attorney, Agent, or Firm* — Finnegan, Henderson, Farabow, Garrett & Dunner, LLP

(57) ABSTRACT

A drive system for a machine is disclosed. The drive system may have an engine, a pump driven by the engine to pressurize fluid, a motor connected to the pump via an inlet passage and an outlet passage, and a traction device driven by the motor. The drive system may also have an operator input device movable from a neutral position through a range to a maximum displaced position to affect a speed of the engine, and a controller in communication with the input device and at least one of the pump and motor. The controller may be configured to gradually adjust a displacement of the at least one of the pump and motor to slow the traction device over a period of time after the operator input device is returned to the neutral position.

20 Claims, 3 Drawing Sheets

(51) Int. Cl.
*F16H 61/421* (2010.01)
*F16H 61/431* (2010.01)
*F16H 61/438* (2010.01)
*F16H 61/47* (2010.01)
*B60K 26/02* (2006.01)

(56) References Cited

U.S. PATENT DOCUMENTS

| | | | |
|---|---|---|---|
| 3,927,528 A | 12/1975 | van der Kolk et al. | |
| 3,969,896 A | 7/1976 | Louis | |
| 4,648,040 A | 3/1987 | Cornell et al. | |
| 5,335,750 A * | 8/1994 | Geringer et al. | 180/307 |
| 5,390,759 A * | 2/1995 | Gollner | 180/307 |
| 6,039,132 A | 3/2000 | Easton | |
| 6,247,378 B1 | 6/2001 | Newendorp et al. | |
| 6,341,488 B1 | 1/2002 | Shimizu et al. | |
| 6,402,660 B1 | 6/2002 | Cronin et al. | |
| 6,442,934 B1 * | 9/2002 | Okuda et al. | 60/451 |
| 6,655,233 B2 | 12/2003 | Evans et al. | |
| 6,829,986 B2 | 12/2004 | Richter | |
| 7,316,115 B1 | 1/2008 | Jansen et al. | |
| 7,373,776 B2 | 5/2008 | Burgart et al. | |
| 7,613,560 B2 * | 11/2009 | Nishi et al. | 701/93 |
| 7,641,588 B2 | 1/2010 | Thomson et al. | |
| 7,707,829 B2 | 5/2010 | Dvorak et al. | |
| 7,712,309 B2 | 5/2010 | Vigholm | |
| 7,926,267 B2 | 4/2011 | Koehler et al. | |
| 7,958,725 B2 * | 6/2011 | Elliott | 60/445 |
| 8,414,457 B2 * | 4/2013 | Oshima | 477/148 |
| 8,781,699 B2 * | 7/2014 | Iwao et al. | 701/67 |
| 2006/0155448 A1 * | 7/2006 | Shah | 701/50 |
| 2009/0288406 A1 * | 11/2009 | Elliott | 60/327 |
| 2010/0127654 A1 * | 5/2010 | Anderson | 318/432 |
| 2010/0230929 A1 | 9/2010 | Ponstein | |
| 2012/0152640 A1 * | 6/2012 | Mori et al. | 180/307 |
| 2013/0014499 A1 * | 1/2013 | Gray, Jr. | 60/327 |
| 2014/0019021 A1 * | 1/2014 | Yanagida et al. | 701/54 |

* cited by examiner

HYSTAT DRIVE SYSTEM HAVING COASTING FUNCTIONALITY

RELATED APPLICATIONS

This application is based on and claims the benefit of priority from U.S. Provisional Application No. 61/554,124 by Michael W. RIES et al., filed Nov. 1, 2011, the contents of which are expressly incorporated herein by reference.

TECHNICAL FIELD

The present disclosure is directed to a machine drive system, and more particularly, to a hystat drive system having coasting functionality.

BACKGROUND

Machines such as wheeled compactors, loaders, trucks, and other mobile equipment are used to perform many tasks. To effectively perform these tasks, the machines require an engine that provides significant torque through a transmission to one or more ground engaging traction devices. Such machines usually include mechanical power-shift transmissions that are connected to the engine by way of a mechanical or hydraulic torque converter, which is intended to cushion the connection between the engine and the transmission. When the engine is disconnected from the transmission via the torque converter, for example when the operator desires to terminate acceleration of the machine, naturally occurring friction within the torque converter causes a gradual slowing down or coasting of the machine.

Consequently, operators have grown accustomed to machine coasting upon terminating a request for machine acceleration (e.g., upon releasing an acceleration pedal or lever). For example, a compactor operator may know that the speed of a conventional compactor may slow down by a specific amount over a certain period of time or within a certain distance and, accordingly, control the machine with expectations of the coasting. Therefore, operators have become comfortable using coasting to complete specific tasks.

Recently, however, conventional power-shift transmissions are being replaced by hydrostatic transmissions (hystats). A hystat provides an infinitely variable torque-to-speed output ratio within its overall range through the pairing of a variable displacement pump and a fixed- or variable-displacement motor. Although a hystat is known to have higher efficiency and extended functionality when compared with a power-shift transmission, it does not behave in the manner discussed above with respect to coasting. Specifically, when an operator releases the acceleration pedal or throttle, displacements of the pump and/or motor are immediately neutralized and the machine either continues traveling at about the same speed for an extended period of time (when both the pump and motor are neutralized) or quickly stops (when only one of the pump and motor are neutralized). Therefore, operators must modulate the acceleration lever or pedal to move through intermediate displacement positions in a gradual manner in order to travel at an increasingly slower speed. This can prove very difficult in rough terrain common to many worksites, especially for unskilled operators, and can cause undue operator fatigue. Accordingly, there is a need to gradually slow the speed of a hystat-equipped machine in an alternative manner.

One such method of machine control is described in U.S. Pat. No. 6,341,488 (the '488 patent) of Shimizu et al. that issued on Jan. 29, 2002. The '488 patent describes a hystat transmission having a variable displacement pump paired together with a fixed displacement motor. In order to inhibit an abrupt stop of a vehicle when an operator releases a control arm, the pump is provided with a piston that generates a friction force against a contact plate of the pump. The friction force resists rotation of the pump's swashplate toward the neutral position such that a return spring returns the swashplate to neutral in a smooth manner.

Although the system of the '488 patent may allow for smooth stopping of a hystat-equipped vehicle, it may still be problematic. In particular, the system of the '488 patent may not allow for coasting of the vehicle for extended periods of time. In addition, the system of the '448 patent may lack applicability to a hystat where displacements of both the pump and motor may benefit from coordinated control.

The system of the present disclosure solves one or more of the problems set forth above and/or other problems of the prior art.

SUMMARY OF THE INVENTION

One aspect of the present disclosure is directed to a drive system. The drive system may include an engine, a pump driven by the engine to pressurize fluid, a motor connected to the pump via an inlet passage and an outlet passage, and a traction device driven by the motor. The drive system may also include an operator input device movable from a neutral position through a range to a maximum displaced position to affect a speed of the engine, and a controller in communication with the input device and at least one of the pump and motor. The controller may be configured to gradually adjust a displacement of the at least one of the pump and motor to slow the traction device over a period of time after the operator input device is returned to the neutral position.

Another aspect of the present disclosure is directed to a method of driving a machine. The method may include pressurizing fluid with an engine-powered pump, and directing pressurized fluid from the pump through a motor to propel the mobile machine. The method may also include receiving a first operator input indicative of a desire to stop propelling the mobile machine, and gradually adjusting displacements of the pump and the motor to slow the machine over a period of time based on the first operator input.

DETAILED DESCRIPTION

Figure 1:
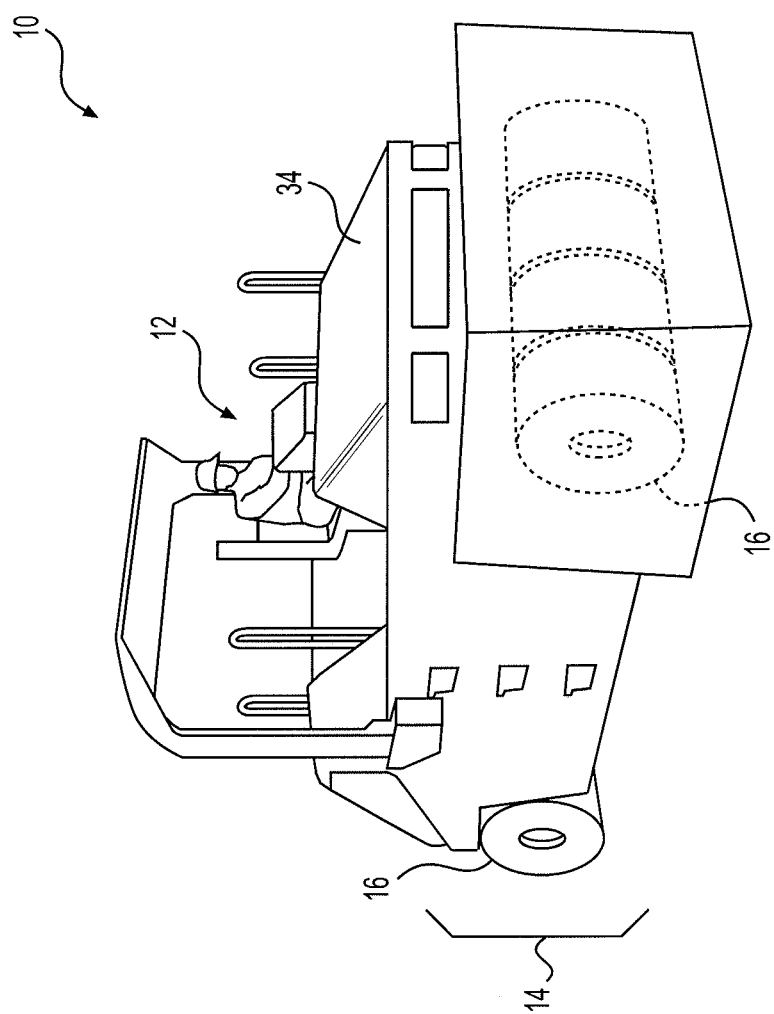
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as paving, mining, construction, farming, transportation, or another industry known in the art. For example, machine 10 may embody a mobile machine such as the wheeled compactor depicted in FIG. 1, an on- or off-highway haul truck, or any other type of mobile machine known in the art. Machine 10 may include an operator station 12, from which operator control of machine 10 may be affected. Machine 10 may also include a drive system 14 supported by a frame of machine 10 and operatively connected to one or more driven and/or steerable traction devices 16, such as, for example, wheels, tracks, or belts located on each side of machine 10.

Figure 2:
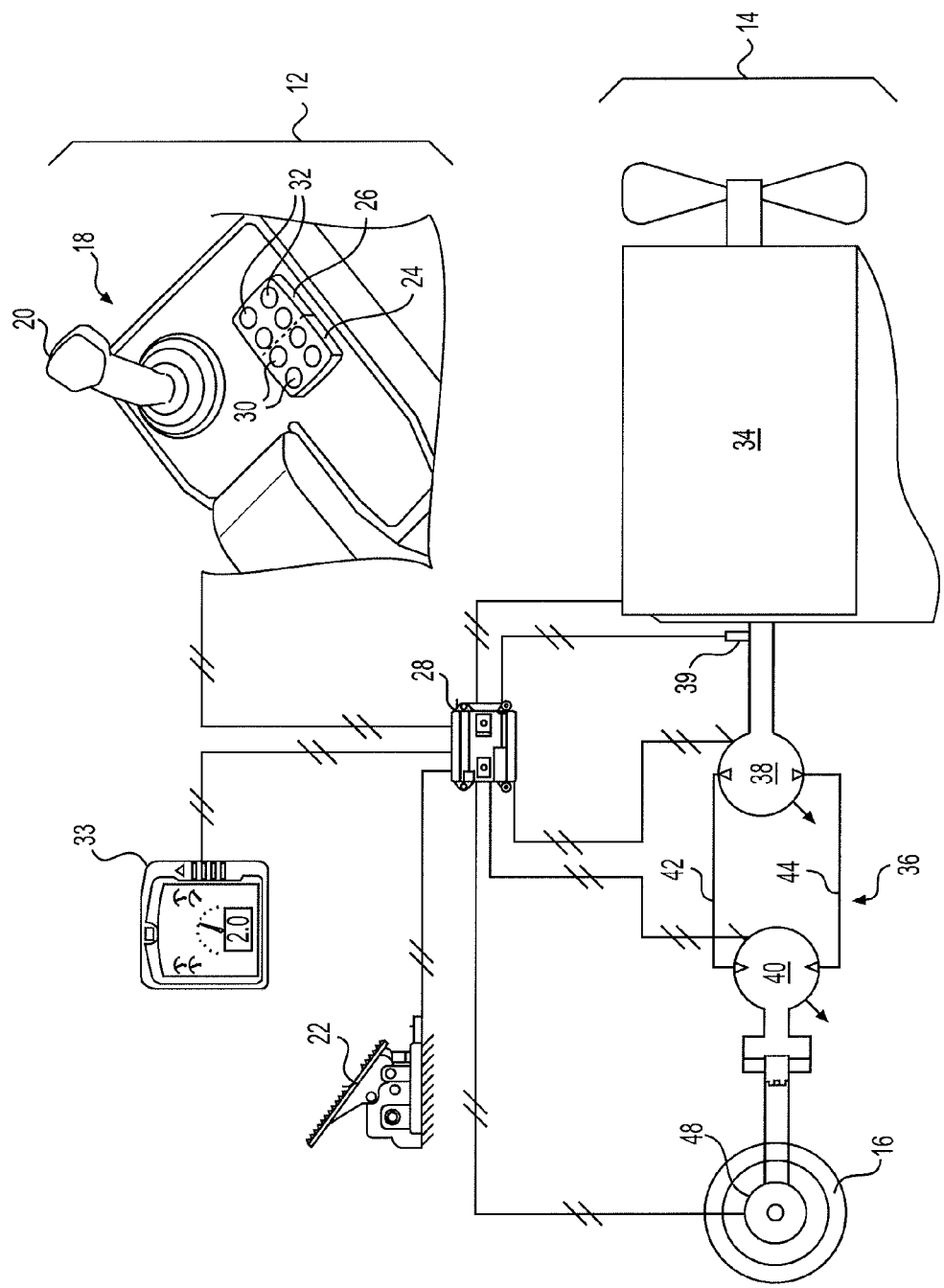
FIG. 2 is a diagrammatic illustration of an exemplary disclosed drive system and an exemplary disclosed operator station for use with the machine of FIG. 1.

As illustrated in FIG. 2, operator station 12 may include an operator interface 18 proximate a seat (not shown) for generating machine command signals indicative of desired machine maneuvers and/or functions in response to operator input. In the disclosed embodiment, operator interface 18 may include a plurality of input devices including a throttle input 20, a brake input 22, a transmission input 24, and a speed input 26. It should be noted, however, that additional operator input devices may be included, if desired. Each input device may take the form of a joystick, a pedal, a push-button, a knob, a switch, or another known device. As an operator manipulates the input devices, the operator may expect and affect corresponding operations of machine 10.

Throttle input 20, in the disclosed embodiment, is shown as a joystick that is tiltable through a range from a neutral position to one or more maximum displaced positions to generate one or more corresponding displacement signals that are indicative of desired engine speeds during machine travel in particular directions. For example, throttle input 20 may be tiltable from the neutral position to a maximum displaced position in a first direction to generate a corresponding first displacement signal. Likewise, throttle input 20 may be tiltable from the neutral position to a maximum displaced position in a second direction to generate a second displacement signal. Values of the first and second displacement signals may correspond with desired amounts (e.g., percents) of a maximum allowable engine speed during machine travel in first and second directions (e.g., in forward and reverse traveling directions), respectively. For instance, when throttle input 20 is in the neutral position, the first signal may have a minimum value, for example about zero, indicating that an engine speed of machine 10 should be about 0% of a current maximum allowable engine speed. Similarly, when throttle input 20 is displaced to a point about halfway between the neutral position and the maximum displaced position in the first direction, the first signal may indicate a desired engine speed of about 50% of the maximum allowable engine speed. It is contemplated that a function other than percentage may be utilized, if desired. The first and second displacement signals generated by throttle input 20 may be directed to a controller 28 for further processing.

Brake input 22, in the disclosed embodiment, is shown as a foot pedal that is pivotable through a range from a neutral position to a maximum displaced position to generate one or more corresponding displacement signals indicative of a desire to decelerate machine 10. The displacement signals generated by brake input 22 may be directed to controller 28 for further processing.

Transmission input 24 and speed input 26, in the disclosed embodiment, may form an integral unit having multiple input components used by an operator to select different modes of operation. Specifically, transmission input 24 may be a touch pad having a plurality of push buttons 30 that, when pressed by the operator of machine 10, select one of any number of available transmission control settings (i.e., virtual gears or portions of a continuous range of transmission speed-to-torque ratios). For example, the operator may press a first of buttons 30 to select a first gear, in which drive system 14 may operate within a highest torque output range and a corresponding lowest travel speed range. Likewise, the operator may press a second of buttons 30 to select a second or higher gear, in which drive system 14 may operate with a lower torque output range and a corresponding higher travel speed range.

Speed input 26 may also be a touch pad having a plurality of push buttons 32 that, when pressed by the operator of machine 10, select one of any number of available engine speed limits corresponding to the maximum displaced position of throttle input 20. For example, the operator may press a first of push buttons 32 to select a first engine speed limit that allows a maximum engine speed of about 1200 rpm when throttle input 20 is tilted to the maximum displaced position in either the first or second directions. Likewise, the operator may press a second of push buttons 32 to select a second engine speed limit that allows a maximum engine speed of about 1500 rpm. It is to be appreciated that the maximum engine speed for each selection may be set to any desired value and/or that a particular push button 32 may correspond with two different maximum engine speeds, if desired, for example a forward traveling engine speed and a reverse traveling engine speed. It is also contemplated that transmission input 24 and speed input 26 may be completely separate components, if desired.

Operator station 12 may also be equipped with a monitor 33 used to display parameters indicating certain aspects of machine status and/or performance for operator acknowledgment. Monitor 33 may be one of a liquid crystal display, a cathode ray tube display, a plasma display, or any other type of display known in the art. Monitor 33 may be caused by controller 28 to display machine settings affected by input devices 20, 22, 24, and/or 26, for example a current speed setting (as provided by throttle input 20), a current transmission gear (as provided by transmission input 24), a current speed limit (as provided by speed input 26), and other parameters known in the art. It is to be appreciated that monitor 33 may itself also receive operator input by way of a touchscreen, software keys, and the like.

Controller 28 may be in communication with operator interface 18 and drive system 14 and configured to control operations of drive system 14 in response to signals received from the operator via interface 18. Communications between controller 28 and the other components of machine 10 may be facilitated by communication links and other suitable network architecture. The communication links may include wired and/or wireless non-proprietary links and protocols, or proprietary links and protocols based on known industry standards, such as J1939, RS-232, RP1210, RS-422, RS-485, MODBUS, CAN, SAEJ1587, Bluetooth, the Internet, an intranet, 802.11b or g, or any other communication links and/or protocols known in the art. The network architecture may include, alone or in any desired combination, a telephone-based network (such as a PBX or POTS), a satellite-based network, a local area network (LAN), a wide area network (WAN), a dedicated intranet, the Internet, and/or any other suitable network architecture.

Controller 28 may include computer-readable memory, such as read-only memories (ROM), random-access memories (RAM), and/or flash memory; secondary storage device(s), such as a tape-drive and/or magnetic disk drive; a microprocessor(s) (CPU), and/or any other components for running the disclosed application. The microprocessor(s) may comprise any suitable combination of commercially-available or specially-constructed microprocessors for controlling system operations in response to operator input. As such, controller 28 may include machine instructions and/or data stored as hardware, software, and/or firmware within the memory, secondary storage device(s), and/or microprocessors. Various other circuits may be associated with controller 28, such as power supply circuitry, signal conditioning circuitry, solenoid driver circuitry, and other types of circuitry, if desired.

As illustrated in FIG. 2, drive system 14 may include components that cooperate to generate and transmit power to traction devices 16 in response to commands from controller 28. In particular, drive system 14 may include a power source 34 configured to generate a power output, and at least one transmission unit 36 operatively coupled thereto to receive, convert, and/or transmit the power output in a useful manner to traction devices 16.

Power source 34 may comprise an internal combustion engine having multiple subsystems that cooperate to produce mechanical or electrical power output. For the purposes of this disclosure, power source 34 is depicted and described as a four-stroke diesel engine. It is to be appreciated, however, that power source 34 may be any other type of internal combustion engine such as, for example, a gasoline or a gaseous fuel-powered engine. The subsystems included within power source 34 may include, for example, a fuel system, an air induction system, an exhaust system, a lubrication system, a cooling system, or any other appropriate system. Controller 28 may be in communication with and able to regulate the operation of any one or more of the subsystems of power source 34.

A sensor 39 may be associated with power source 34 to sense an output speed thereof. Sensor 39 may embody, for example, a magnetic pickup-type sensor in communication with a magnet embedded within a rotational component of power source 34, such as a crankshaft, flywheel, or the like. During operation of power source 34, sensor 39 may detect a rotating magnetic field produced by the embedded magnet and generate a corresponding feedback signal in response. As such, in one aspect, the signal may have a frequency component directly proportional to the output speed of power source 34. Signals produced by sensor 39 that are indicative of an actual engine speed of power source 34 may be directed to controller 28 for further processing.

Transmission unit 36 may embody a hydrostatic transmission (hystat) having an infinite number of available torque-to-speed output ratios (i.e., virtual gears) within its continuous overall range. Transmission unit 36 may include a pump 38 coupled to receive the output of power source 34. Pump 38 may be operatively hydraulically connected to power a motor 40 via first and second passages 42, 44, and motor 40 may be driven by pressurized fluid from pump 38 to rotate traction devices 16 and propel machine 10. As will be described in more detail below, one or more operational characteristics of pump 38 and/or motor 40 may be responsively regulated by controller 28 to affect a desired torque-to-speed ratio or subset of ratios within the continuous range of transmission unit 36.

Pump 38 may have variable displacement and be controlled by controller 28 to draw fluid from motor 40 and discharge the fluid at a specified elevated pressure and/or rate back to motor 40 in two different directions. That is, pump 38 may include a stroke-adjusting mechanism, for example a swashplate, a position of which is hydro- or electro-mechanically adjusted based on, among other things, a desired speed and/or torque of motor 40 to thereby vary an output (e.g., a discharge pressure or rate) of pump 38. The displacement of pump 38 may be adjusted from a zero displacement position at which substantially no fluid is discharged from pump 38, to a maximum displacement position in a first direction at which fluid is discharged from pump at a maximum rate into first passage 42. Likewise, the displacement of pump 38 may be adjusted from the zero displacement position to a maximum displacement position in a second direction at which fluid is discharged from pump 38 at a maximum rate into second passage 44 (i.e., pump 38 may be an over-center pump). Pump 38 may be drivably connected to power source 34 of machine 10 by, for example, a countershaft, a belt, or in another suitable manner. Alternatively, pump 38 may be indirectly connected to power source 34 via a torque converter, a gear box, an electrical circuit, or in any other manner known in the art.

Motor 40 may be driven to rotate by a fluid pressure differential generated by pump 38. Specifically, motor 40 may include first and second chambers (not shown) located to either side of a pumping mechanism such as an impeller, plunger, or series of pistons (not shown). When the first chamber is filled with pressurized fluid from pump 38 via first passage 42 and the second chamber is drained of fluid returning to pump 38 via second passage 44, the pumping mechanism may be urged to move or rotate in a first direction (e.g., in a forward traveling direction). Conversely, when the first chamber is drained of fluid and the second chamber is filled with pressurized fluid, the pumping mechanism may be urged to move or rotate in an opposite direction (e.g., in a rearward traveling direction). The flow rate of fluid into and out of the first and second chambers may determine an output velocity of motor 40, while a pressure differential across the pumping mechanism may determine an output torque. It is contemplated that a displacement of motor 40 may be variable, if desired, such that for a given flow rate and/or pressure of supplied fluid, a speed and/or torque output of motor 40 may be adjusted by controller 28.

In some embodiments, motor 40 may also be mechanically driven to create a pressure differential within transmission unit 36 that functions to slow machine 10 and/or recuperate energy during deceleration of machine 10. In particular, there may be times when traction devices 16 rotate at a faster speed and/or with greater torque than motor 40 would otherwise be driven by fluid from pump 38. In this situation, motor 40 may function as a pump, pressurizing fluid directed back to pump 38, which may function as a motor in this situation. When motor 40 pressurizes fluid, energy imparted to motor 40 by traction devices 16 may be dissipated, thereby slowing the rotation of traction devices 16. The pressurized fluid directed from motor 40 back to pump 38 may reduce a load placed on power source 34 by pump 38 and, in some situations, even be used to drive power source 34.

In some applications, the use of motor 40 to slow and/or stop machine 10 may be insufficient. In these applications, machine 10 may be equipped with a braking device 48. Braking device 48 may be operatively associated with one or more traction devices 16 of machine 10 and be configured to retard the motion of machine 10 when commanded to do so by controller 28 (e.g., in response to a braking signal received via brake input 22). In one embodiment, braking device 48 may include a hydraulic pressure-actuated wheel brake such as, for example, a disk brake or a drum brake that is disposed intermediate a wheel of traction device 16 and a corresponding final drive assembly (not shown) of machine 10. When actuated, pressurized fluid within braking device 48 may be utilized to increase the rolling friction of machine 10.

Figure 3:
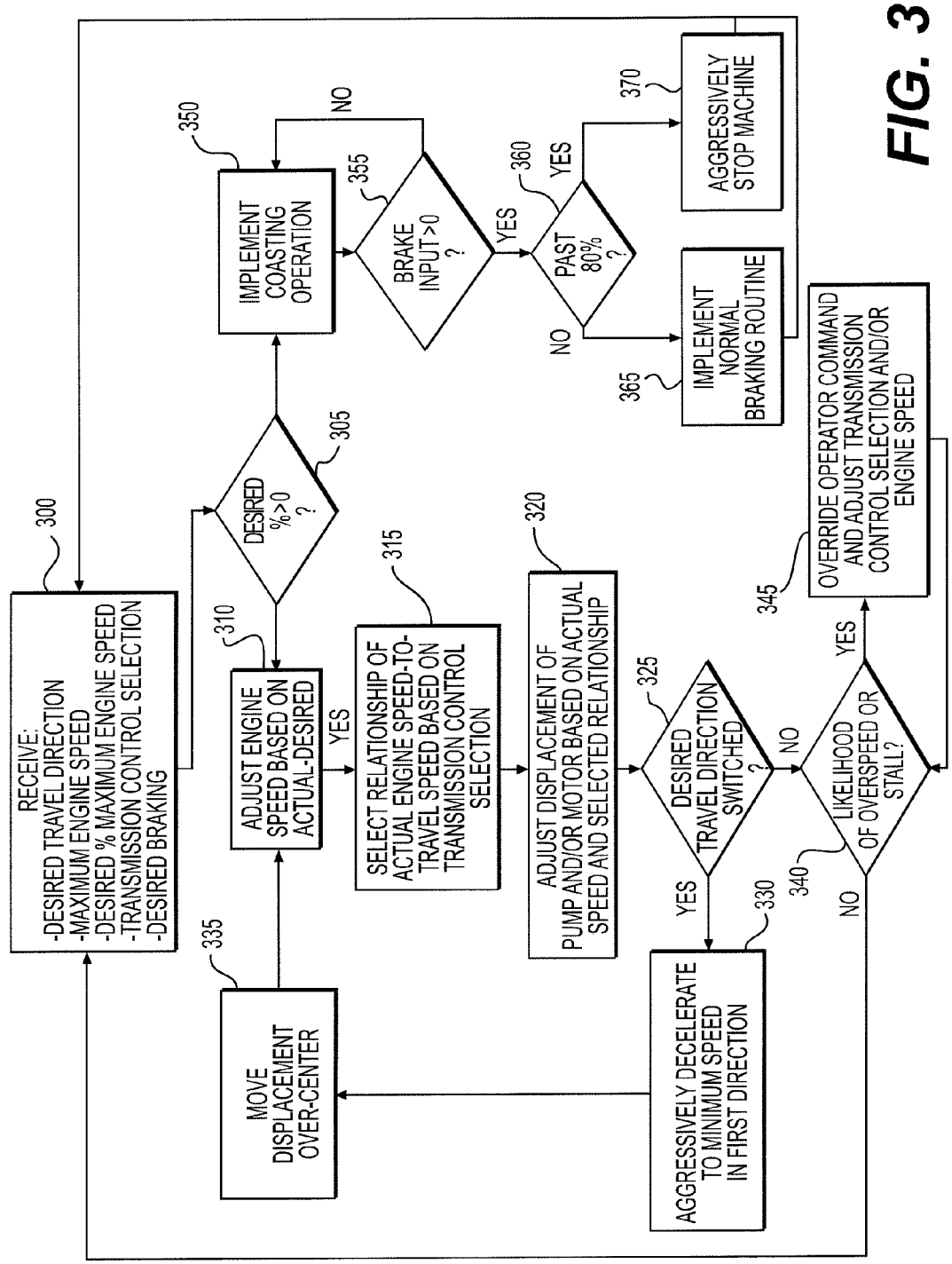
FIG. 3 is an exemplary disclosed method of operating the drive system of FIG. 2 in response to signals received from the operator station.

FIG. 3 illustrates an exemplary method of controlling drive system 14 in response to signals received from operator station 12. FIG. 3 will be discussed in detail in the following section to further illustrate the disclosed concepts.

INDUSTRIAL APPLICABILITY

The disclosed drive system 14 may be applicable to any mobile machine having a hystat. The disclosed drive system 14 may allow a mobile machine equipped with a hystat to coast in a manner similar to that previously experienced by operators of machines equipped with power-shift transmissions. Accordingly, the known efficiency benefits of a hystat may be realized in any mobile machine, without sacrificing operator comfort and familiarity associated with the earlier transmission types. Operation of drive system 14 will now be described.

As shown in FIG. 3, during startup of drive system 14, controller 28 may receive input from the operator of machine 10 (Step 300). The input may include, among other things, a desired travel direction, a maximum allowable engine speed, a desired engine speed, a transmission control selection, and any desired braking. The desired travel direction may be indicated by the operator via the tilt direction of throttle input 20. The maximum engine speed may be selected via speed input 26 and correspond with a maximum engine speed that the operator would like power source 34 to achieve when throttle input 20 is moved to its maximum displaced position. The desired engine speed may be selected via throttle input 20 as a function (e.g., a percent) of the maximum engine speed. The transmission control selection may be indicated by the operator via transmission input 24 and correspond with a specific portion of the overall speed-to-torque range of transmission unit 36. Desired braking may be indicated via manipulation of braking input 22.

After receiving signals from each of throttle input 20, braking input 22, transmission input 24, and speed input 26, controller 28 may determine if acceleration of machine 10 is desired (Step 305). Controller 28 may determine that acceleration of machine 10 is desired when the desired engine speed is greater than a threshold amount (e.g., about 0%) of the maximum allowable engine speed and a non-zero transmission setting has been selected (i.e., when neutral or park settings of transmission unit 36 have not been selected).

When controller 28 determines that acceleration of machine 10 is desired by the operator of machine 10, controller 28 may adjust a speed of power source 34 based on a difference between the desired engine speed received via throttle input 20 and an actual engine speed of power source 34 that is sensed by sensor 39 (Step 310). The speed of power source 34 may be adjusted by issuing appropriate commands to power source 34 (e.g., by issuing commands to the fuel and/or air induction systems) until the difference between the desired engine speed and the actual engine speed is less than an acceptable amount. Controller 28 may then select for use a particular relationship from among a plurality of available relationships contained within an acceleration map stored in the memory of controller 28 (Step 315). In the disclosed embodiment, each relationship may correspond with the transmission control selection received from the operator, and take the form of an acceleration curve that relates the actual engine speed to a travel speed of machine 10. Controller 28 may use the selected relationship to adjust displacement(s) of pump 38 and/or motor 40 until the travel speed corresponding with the actual engine speed is substantially achieved (Step 320). It should be noted that, although steps 310-320 are shown and described as occurring in a particular order, it is contemplated that these steps may be completed in a different order or completed simultaneously, if desired.

If during travel of machine 10 in a particular direction (e.g., in a forward direction), the operator quickly moves throttle input 20 through the neutral position to another displaced position in an opposite direction (e.g., in less than a minimum length of time), the operator may be indicating a wish for machine 10 to switch travel directions (e.g., from forward to reverse) as quickly as possible. In some instances, the operator may switch the displacement directions of throttle input 20 without first waiting for machine 10 to come to a complete stop in the first direction. If controller 28 were to cause machine 10 to accelerate exactly as requested by the operator, machine 10 could be caused to operate in a jerky manner (e.g., to spin out) that, in the example of the compacting paving operation, could mar the work surface. Accordingly, controller 28 may be configured to detect when the operator has quickly switched displacement directions of throttle input 20 (Step 325) and respond accordingly.

When controller 28 determines that the operator of machine 10 has quickly switched displacement directions of throttle input 20, controller 28 may aggressively decelerate machine 10 to below a minimum speed (e.g., to about a complete stop) in the original direction (Step 330), and then flip the stroke-adjusting mechanism of pump 38 over center (Step 335), before accelerating machine 10 in the new direction following the normal acceleration routine (i.e., before returning to steps 310-320). In some embodiments, this aggressive deceleration of machine 10 may involve immediate displacement control of only pump 38. In other embodiments, however, the aggressive deceleration of machine 10 may involve only activation of braking device 48 or simultaneous control of pump displacement and activation of braking device 48. In yet other embodiments, the aggressiveness of this deceleration may be based, at least partially, on an initial speed in the original direction. That is, for higher initial speeds, controller 28 may implement a more aggressive deceleration than implemented for lower initial speeds.

At any time during operation of machine 10, it may be possible for machine 10 to overspeed or stall when controlled according to the operator selected engine speed and transmission control selection. For example, when traveling down a steep incline in a selected low gear, it may be possible for motor 40 to drive power source 34 through pump 38 to an excessive speed that could result in damage to power source 34. In another example, when traveling up a steep incline in a selected high gear, it may be possible for the load on power source 34 to cause power source 34 to lug to a low speed sufficient to cause instabilities in the operation of power source 34. Accordingly, controller 28 may continuously monitor the speed of power source 34 via sensor 39 and determine if overspeeding or stalling is likely or has already occurred (Step 340).

If there is a chance of power source 34 overspeeding or stalling, controller 28 may override selections made by the operator (e.g., transmission control selection, desired engine speed, and/or maximum allowable engine speed), and adjust operation of machine 10 to protect the components of machine 10 (Step 345). For example, when overspeed is likely or already occurring, controller 28 may cause transmission unit 36 to adjust to a higher gear such that the speed of power source 34 may be reduced. In another example, when stall is likely or already occurring, controller 28 may cause transmission unit 36 to adjust to a lower gear such that the speed of power source 34 may increase. It should be noted that, during completion of step 325, when controller 28 determines that throttle input 20 has not switched directions, control may skip step 330-335 and continue through steps 340-345 in the manner described above.

Returning to step 305, when controller 28 determines that acceleration of machine 10 is no longer desired by the operator of machine 10 (e.g., when throttle input 20 has been returned to the neutral position), controller 28 may responsively implement a coasting operation (Step 350). In particular, controller 28 may begin adjusting the speed-to-torque ratio of transmission unit 36 in a gradual manner such that machine 10 slows down by a desired amount over a desired period of time. As described above, the speed-to-torque ratio of transmission unit 36 may be adjusted by adjusting the displacements of pump 38 and/or motor 40. In the disclosed exemplary embodiment, controller 28 simultaneously adjusts the displacements of both pump 38 and motor 40 during the coasting operation. It is contemplated that controller 28 may also adjust operation of power source 34 (e.g., of the fuel and/or air induction subsystems of power source 34) such that the actual speed of power source 34 remains at about the desired engine speed selected by the operator during implementation of the transmission adjustments.

The deceleration of machine 10 during the coasting operation may be substantially linear for a majority of the period of time that machine 10 decelerates (e.g., for about 70-90% of the period of time), and then include a short curvilinear deceleration toward the very end of the time period (e.g., for about the remaining 10-30% of the period of time). This curvilinear deceleration may help to feather machine 10 to a complete stop, which may be helpful in applications such as compacting pavement where an immediate stop could mar the newly-compacted pavement. The length of the time period during which machine 10 decelerates during the coasting operation may be variable and at least partially dependent on a travel speed of machine 10 and/or the actual engine speed of power source 34 at the time that the coasting operation is initiated. In the disclosed embodiment, controller 28 may use a coasting deceleration map having at least one deceleration curve that relates the travel speed of machine 10 to a time period elapsed since initiation of the coasting operation. It is contemplated, however, that other methods and/or algorithms may be utilized to deceleration machine 10 during coasting, if desired.

During operation of machine 10, there may be times after release of throttle input 20 when the operator of machine 10 desires to slow machine 10 faster than implemented via the coasting operation described above. In these situations, the operator may move brake input 22 a distance toward the maximum displaced position. Controller 28 may detect this movement (Step 355) and selectively interrupt the coasting operation to implement one of at least two different braking operations depending on the displaced position of brake input 22. In particular, if, during a comparison step 360, controller 28 determines that brake input 22 has been displaced less than about 70-90% of the distance from its neutral position to its maximum displaced position (e.g., past about 80%), controller 28 may implement a normal braking routine (Step 365). If during completion of step 360, however, controller 28 determines that brake input 22 has been displaced to a position more than about the 70-90% position, controller 28 may instead aggressively stop machine 10 (Step 370). To aggressively stop machine 10, controller 28 may activate braking device 48, for example to a degree substantially proportional to the displaced position of brake input 22. In some embodiments, controller 28 may only activate braking device 48 when a particular transmission gear has been selected by the operator, for example only when transmission unit 36 is operating in second gear or third gear. It is contemplated that, in the same or other embodiments, activation of braking device 48 may continue until machine 10 has come to a complete stop, even if the operator releases brake input 22 before the complete stop has been achieved.

In one embodiment, the normal braking routine may first involve displacement control of only pump 38, but in a manner more aggressive than associated with the coasting operation described above. That is, controller 28 may utilize a braking deceleration map stored in memory that, like the coasting deceleration map, includes at least one deceleration curve relating a travel speed of machine 10 to a time elapsed since initiation of the operation. The time period of deceleration included in the braking deceleration map, however, may be shorter than the time period included in the coasting deceleration map. After controller 28 has adjusted the displacement of pump 38 to its fullest extent, controller 28 may then make adjustments to motor 40 to continue deceleration during the normal braking routine, if desired.

It will be apparent to those skilled in the art that various modifications and variations can be made to the disclosed drive system. Other embodiments will be apparent to those skilled in the art from consideration of the specification and practice of the disclosed drive system. It is intended that the specification and examples be considered as exemplary only, with a true scope being indicated by the following claims and their equivalents.

What is claimed is:

1. A drive system, comprising:
   an engine;
   a pump driven by the engine to pressurize fluid;
   a motor connected to the pump via an inlet passage and an outlet passage;
   a traction device driven by the motor;
   an operator input device movable from a neutral position through a range to a maximum displaced position to affect a speed of the engine; and
   a controller in communication with the operator input device and at least one of the pump and motor, the controller being programmed to adjust a displacement of at least one of the pump and the motor in a gradual manner that slows the traction device over a coast to stop time after the operator input device is returned to the neutral position,
   wherein the controller includes stored in memory a coasting deceleration map having at least one curve relating a parameter to the coast to stop time.

2. The drive system of claim 1, wherein the controller is in communication with both the pump and the motor and configured to gradually adjust displacements of the pump and motor to slow the traction device over the coast to stop time after the operator input device is returned to the neutral position.

3. The drive system of claim 2, wherein the controller is configured to simultaneously adjust the displacements of the pump and motor.

4. The drive system of claim 2, wherein the controller is configured to adjust the displacements of the pump and motor in a substantially linear manner for a majority of the coast to stop time.

5. The drive system of claim 4, wherein the controller is configured to adjust the displacements of the pump and motor in a curvilinear manner for a minority of the coast to stop time at an end of the coast to stop time.

6. The drive system of claim 5, wherein the minority of the coast to stop time is equal to about 20% of the period of time.

7. The drive system of claim 2, wherein the parameter is travel speed.

8. The drive system of claim 7, wherein the at least one curve includes a plurality of curves, each of the plurality of curves corresponding to a different operator-selectable speed-to-torque ratio range of the pump and motor.

9. The drive system of claim 7, further including a brake input configured to generate a braking signal when manipulated by an operator, wherein:
   the controller includes stored in memory a braking deceleration map having at least one curve relating travel speed to the time period; and the controller is further configured to adjust displacement of at least the pump based on the braking deceleration map after receipt of the braking signal.

10. The drive system of claim 9, wherein the controller is configured adjust the displacement of the pump before adjusting the displacement of the motor after receipt of the braking signal.

11. The drive system of claim 9, wherein:
the brake input is displaceable by the operator from a neutral position through a range to a maximum displaced position;
the controller is configured to adjust displacement of at least the pump based on the braking deceleration map in a gradual manner when the brake input is displaced to a position less than about 70-90% of the range of the brake input; and
the controller is configured to adjust displacement of the at least the pump in an immediate manner when the brake input is displaced to a position greater than about 70-90% of the range of the brake input.

12. The drive system of claim 11, further including a braking device, wherein the controller is further configured to activate the braking device when the brake input is displaced to a position greater than about 70-90% of the range of the brake input.

13. The drive system of claim 12, wherein the controller is configured to activate the braking device only when an operator-selectable speed-to-torque ratio of the pump and motor is a particular speed-to-torque ratio.

14. The drive system of claim 12, wherein the controller is configured to continue activating the braking device after the operator stops manipulating the brake input.

15. A method of driving a mobile machine, comprising:
pressurizing fluid with an engine-powered pump;
directing pressurized fluid from the pump through a motor to propel the mobile machine;
receiving a first operator input indicative of a desire to stop propelling the mobile machine; and
adjusting displacements of the pump and the motor in a gradual manner that slows the mobile machine over a coast to stop time after receipt of the first operator input, based on a coasting deceleration map having at least one curve relating a parameter to the coast to stop time.

16. The method of claim 15, wherein gradually adjusting displacements of the pump and motor includes simultaneously adjusting displacements of the pump and motor in a linear manner for a majority of the coast to stop time, and simultaneously adjusting displacements of the pump and motor in a curvilinear manner for a minority of the coast to stop time at an end of the coast to stop time.

17. The method of claim 16, further including receiving an operator selection of one of a plurality of available speed-to-torque ratio ranges of the pump and motor, wherein the linear manner in which the displacements of the pump and motor are gradually adjusted is varied based on the operator selection.

18. The method of claim 15, further including:
receiving a second operator input indicative of a desire to brake the mobile machine;
gradually adjusting displacements of the pump and the motor over a period of time based on the second operator input when the second operator input is less than about 70-90% of a maximum input, wherein the period of time based on the second operator input is shorter than the coast to stop time based on the first operator input; and
immediately adjusting the displacements of the pump and motor when the second operator input is greater than about 70-90% of the maximum input.

19. The method of claim 18, further including activating a braking device when the second operator input is greater than about 70-90% of the maximum input.

20. A machine, comprising:
a frame;
a plurality of traction devices operatively coupled to the frame;
a braking device associated with at least one of the plurality of traction devices;
an engine supported by the frame;
a pump powered by the engine to pressurize fluid;
a motor driven by the pump to propel at least one of the plurality of traction devices;
an operator station having at least a first input device movable from a neutral position through a range to a maximum displaced position to affect acceleration of the machine, and a second input device movable from a neutral position through a range to a maximum displaced position to affect deceleration of the machine; and
a controller in communication with the first input device, the second input device, the pump, and the motor, the controller being programmed to:
gradually and simultaneously adjust displacements of the pump and motor to slow the plurality of traction devices over a first period of time after the first input device is returned to the neutral position, wherein the controller is configured to adjust the displacements of the pump and motor in a linear manner for a majority of the first period of time and to adjust the displacements of the pump and motor in a curvilinear manner for a minority of the first period of time at an end of the first period of time;
gradually adjust displacement of at least the pump to slow the plurality of traction devices over a second period of time shorter than the first period of time when the second input device is displaced to a position less than about 70-90% of the range of the second input device;
adjust displacement of at least the pump in an immediate manner when the second input device is displaced to a position greater than about 70-90% of the range of the second input device; and
activate the braking device when the second input device is displaced to a position greater than about 70-90% of the range of the second input device.

* * * * *